(12) United States Patent
Gao et al.

(10) Patent No.: US 6,925,154 B2
(45) Date of Patent: Aug. 2, 2005

(54) METHODS AND APPARATUS FOR CONVERSATIONAL NAME DIALING SYSTEMS

(75) Inventors: Yuqing Gao, Mount Kisco, NY (US); Bhuvana Ramabhadran, Mount Kisco, NY (US); Chengjun Julian Chen, Delray Beach, FL (US); Hakan Erdogan, Croton on Hudson, NY (US); Michael A. Picheny, White Plains, NY (US)

(73) Assignee: International Business Machines Corproation, Armonk, NY (US)

(*) Notice: Subject to any disclaimer, the term of this patent is extended or adjusted under 35 U.S.C. 154(b) by 0 days.

(21) Appl. No.: 10/139,255

(22) Filed: May 3, 2002

(65) Prior Publication Data

US 2002/0196911 A1 Dec. 26, 2002

Related U.S. Application Data

(60) Provisional application No. 60/288,980, filed on May 4, 2001.

(51) Int. Cl.$^7$ ............................................. H04M 1/64
(52) U.S. Cl. ................... 379/88.03; 704/247; 704/275; 455/563; 455/564
(58) Field of Search ..................... 379/88.01–88.04, 379/355.01–355.04; 704/246, 247, 250, 270, 276, 278, 270.1; 455/79, 563, 564

(56) References Cited

U.S. PATENT DOCUMENTS

| | | | | |
|---|---|---|---|---|
| 5,566,272 A | * | 10/1996 | Brems et al. ............... 704/231 |
| 5,638,425 A | * | 6/1997 | Meador et al. .......... 379/88.01 |
| 5,832,063 A | * | 11/1998 | Vysotsky et al. ......... 379/88.03 |
| 5,864,815 A | * | 1/1999 | Rozak et al. ............... 704/275 |
| 5,917,890 A | * | 6/1999 | Brotman et al. ......... 379/88.01 |
| 5,917,891 A | * | 6/1999 | Will ......................... 379/88.03 |
| 6,122,361 A | * | 9/2000 | Gupta .......................... 379/223 |
| 6,163,596 A | * | 12/2000 | Gelfer et al. ............... 379/67.1 |
| 6,167,117 A | * | 12/2000 | Will ......................... 379/88.03 |
| 6,173,266 B1 | * | 1/2001 | Marx et al. .................. 704/270 |
| 6,253,004 B1 | * | 6/2001 | Lee et al. ..................... 385/31 |
| 6,314,165 B1 | * | 11/2001 | Junqua et al. ........... 379/88.03 |
| 6,421,672 B1 | * | 7/2002 | McAllister et al. ........... 707/10 |
| 6,462,616 B1 | * | 10/2002 | Beswick et al. ......... 379/88.03 |
| 6,523,004 B1 | * | 2/2003 | Vanbuskirk et al. ........ 704/251 |
| RE38,101 E | * | 4/2003 | Vysotsky et al. ........ 379/88.03 |
| 6,587,818 B2 | * | 7/2003 | Kanevsky et al. .......... 704/251 |
| 6,625,595 B1 | * | 9/2003 | Anderson et al. .............. 707/3 |
| 6,751,595 B2 | * | 6/2004 | Busayapongchai et al. . 704/275 |
| 2002/0064257 A1 | * | 5/2002 | Denenberg et al. ....... 379/88.03 |
| 2002/0196911 A1 | * | 12/2002 | Gao et al. ................. 379/88.03 |

OTHER PUBLICATIONS

L. R. Bahl et al., entitled "Robust Methods for Using Context–Dependent Features and Models in a Continuous Speech Recognizer," pp. 533–536 which was submitted to the Proceedings of IEEE ICASSP in 1994.

(Continued)

*Primary Examiner*—Roland G. Foster
(74) *Attorney, Agent, or Firm*—Ryan, Mason & Lewis, LLP (57) ABSTRACT

Techniques for providing an automated conversational name dialing system for placing a call in response to an input by a user. One technique begins with the step of analyzing an input from a user, wherein the input includes information directed to identifying an intended recipient of a telephone call from the user. At least one candidate for the intended recipient is identified in response to the input, wherein the at least one candidate represents at least one potential match between the intended recipient and a predetermined vocabulary. A confidence measure indicative of a likelihood that the at least one candidate is the intended recipient is determined, and additional information is obtained from the user to increase the likelihood that the at least one candidate is the intended recipient, based on the determined confidence measure.

19 Claims, 8 Drawing Sheets

OTHER PUBLICATIONS

C. J. Leggetter et al., entitled "Maximum Likelihood Linear Regression for Speaker Adaptation of Continuous Density Hidden Markov Models," Computer Speech and Language, vol. 9, pp. 171–185, 1995.

J. L. Gauvain et al., entitled "Maximum–a–Posteriori Estimation for Multivariate Gaussian Observations and Markov Chains," IEEE Trans. Speech and Audio Processing, vol. 2, No. 2, pp. 291–298, Apr. 1994.

H. Erdogan et al., entitled "Rapid Adaptation Using Penalized–likelihood Methods," ICASSP 2001.

B. Ramabhadran et al., entitled "Acoustics–Only Based Automatic Phonetic Baseform Generation," Proceedings of ICASSP 1998, vol. 1, 1998.

B. Maison et al., entitled "Robust Confidence Annotation and Rejection for Continuous Speech Recognition," ICASSP 2001.

T. Kemp et al., entitled "Estimating Confidence Using Word Lattices," Eurospeech 1997, pp. 827–830.

C.S. Ramalingam et Al., "Speaker–Independent Name Dialing with Out–of–vocabulary Rejection," Proceedings of IEEE ICASSP 1997, vol. 2, pp. 1475–1478.

J.M. Elvira et al., "Name Dialing Using Final User Defined Vocabularies in Mobile (Gsm and Tacs) and Fixed Telephone Networks," Proceedings of IEEE ICASSP '98, vol. 2, pp. 849–852.

C.S. Ramalingam et al., "Speaker Dependent Name Dialing in a Car Environment with Out–of–vocabulary Rejection," Proceedings of IEEE ICASSP '99, vol. 1, pp. 165–168.

Y. Li et al., "Weighted Pairwise Scatter to Improve Linear Discriminant Analysis," Proceedings of ICSLP2000, vol. 4, pp. 608–611.

Y. Gao et al., "Speaker Adaptation Based on Pre–Clustering Training Speakers," Proceedings of EuroSpeech 1997, pp. 2091–2094.

* cited by examiner

МЕТHODS AND APPARATUS FOR
CONVERSATIONAL NAME DIALING
SYSTEMS

CROSS REFERENCE TO RELATED APPLICATION

This application claims priority to the U.S. provisional patent application identified by Ser. No. 60/288,980, filed on May 4, 2001, the disclosure of which is incorporated by reference herein.

FIELD OF THE INVENTION

The present invention relates generally to name dialing and directory assistance techniques and, more particularly, to a conversational name dialing system.

BACKGROUND OF THE INVENTION

Automatic name dialing is a term that is used to describe an application for making a telephone connection by speaking the name of the party to be connected to, instead of manually dialing the telephone number. Automatic name dialing is an application of voice recognition technology with additional features directed to telephones.

Automatic name dialing is a practical and interesting application of speech recognition to telephony systems. Existing name dialing and directory assistance systems include those sold by Nortel Communications and Nuance Communications. These systems have a simple and straightforward call flow. Error recovery is typically impossible with the user having to start all over again.

When a list of names to be recognized includes as many as 200,000 entries, and when telephone calls are received from all sorts of different channels and environments, the name recognition task becomes a very complex speech recognition problem. Unlike transcription tasks, such as the switchboard task, recognition of names poses a variety of different problems. For example, several problems arise from the fact that foreign names are hard to pronounce for speakers who are not familiar with the names and that there are no standardized methods for pronouncing proper names.

Typically, the overall accuracy of a name dialing system depends on a number of factors, including the speech recognition accuracy for multiple channels and noise environments, the number of homonyms and out-of-vocabulary entries in the name list, and the search speed when no language model can be used. The overall success rate of the system depends on factors such as, for example, the speech recognition accuracy, the call volume handling capability, the response speed and the user-friendliness of the user interface. Noise robustness is another very important factor, since many calls are typically made from noisy environments, such as from a car, cafeteria, airport, etc., and over different kinds of cellular and land-line telephone channels.

Furthermore, problems associated with large vocabulary name recognition systems in particular, in many cases, cannot be handled in a manner similar to small or medium vocabulary systems. Tasks such as digit or spelling recognition, or even small vocabulary (less than 100) name recognition applications, are more easily applied to small vocabulary systems.

The prior art in the name recognition area has typically focused on small vocabulary, speaker dependent and limited application environments. Thus, new approaches and algorithms are needed in order to achieve high recognition accuracy in the large vocabulary name recognition systems.

SUMMARY OF THE INVENTION

The present invention is directed to a large vocabulary name dialing system which is configured to handle calls from various channels and environments, such as calls from land-line, speaker phone, or cellular, and calls made from office, home, public phone or car, etc. More specifically, the present invention provides innovative techniques that improve name recognition accuracy and provide a conversational interface to name dialing applications. The present invention also provides techniques to improve the accuracy of name dialing systems by carefully designing the interface between the system and the caller, thus minimizing or eliminating confusion and user errors.

Advantageously, application of the techniques of the present invention results in a significant reduction of operator overload, since the number of calls to a live operator is reduced. The advantages of the present invention are realized from the perspective of large vocabulary continuous speech recognition (LVCSR) systems.

In one aspect of the present invention, techniques for providing an automated large vocabulary conversational name dialing system for placing a call in response to an input by a user is provided. One technique begins with the step of analyzing an input from a user, wherein the input includes information directed to identifying an intended recipient of a telephone call from the user. At least one candidate for the intended recipient is identified in response to the input, wherein the at least one candidate represents at least one potential match between the intended recipient and a predetermined vocabulary. A confidence measure indicative of a likelihood that the at least one candidate is the intended recipient is determined, and additional information is obtained from the user to increase the likelihood that the at least one candidate is the intended recipient, based on the determined confidence measure.

These and other aspects, features and advantages of the present invention will become apparent from the following detailed description of preferred embodiments thereof, which is to be read in conjunction with the accompanying drawings, wherein like elements are designated by identical reference numerals throughout the several views.

DETAILED DESCRIPTION OF PREFERRED EMBODIMENTS

The present invention discloses techniques which improve the accuracy and usability of name dialing systems. The invention changes the name dialing system into a virtual person–person interaction experience.

Generally, the present invention provides algorithms and techniques which solve problems associated with large vocabulary systems as described herein. Specifically, the present invention optimizes the context-dependent Hidden Markov Model (HMM) states and the Gaussians used to model them. In preferred embodiments, the present invention utilizes speaker clustering, rapid adaptation and massive adaptation algorithms and pronunciation modeling to handle large vocabularies.

Figure 1A:
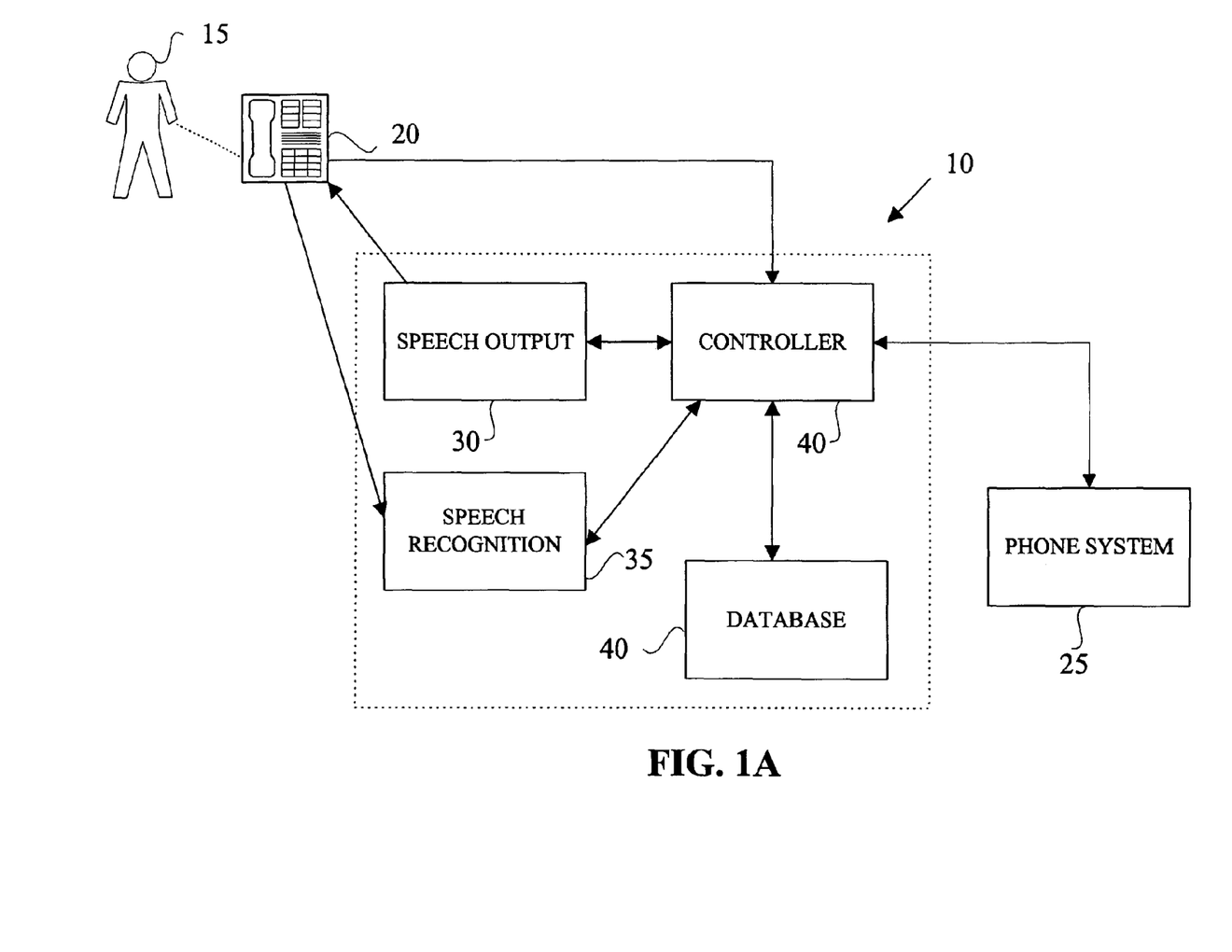
FIG. 1A is a block diagram illustrating of a conversational name dialing system in accordance with an embodiment of the present invention.

Referring now to the drawings in detail and initially to FIG. 1A, a block diagram of a conversational name dialing system 10 in accordance with an embodiment of the present invention is illustrated. More specifically, a user 15 is illustrated conversing via telephone 20 with a conversational name dialing system 10 in an attempt to contact a person through phone system 25. Conversational name dialing system 10 includes a speech output module 30, a speech recognition module 35, a controller 40 and a database 45.

The user 15 initiates a process by connecting with the conversational name dialing system 10 via telephone 20. The user 15 enters a user input into the conversational name dialing system 10. The user input may take the form of an input utterance (i.e., a verbal request) or a non-verbal response (e.g., an electronic input, such as, for example, depressing a key on a telephone number pad). The user input utterances are received by speech recognition module 35 wherein the user input is interpreted and forwarded to the controller 40. Non-verbal responses may be routed directly to the controller 40. The controller 40 processes the information that it receives from the speech recognition module 35 or directly from the user, and accesses database 45 in an attempt to find a match for the user input. The controller 40 provides overall control over the speech output module and the speech recognition module. After accessing database 45, the controller 40 either connects the user 15 with phone system 25 (so as to place a call to the desired party) or provides feedback to user 15 via the speech output module 30. For example, controller 40 may attempt to confirm a name with the user via speech output module 30. The speech output module 30 may be a text-to-speech (TTS) system or even a set of previously recorded responses to be played to the user depending on the situation. The database 45 preferably includes at least a first set of items including the location, first name or nickname and last name, title, department and other keywords which are associated with the intended recipient of the phone call. These items are typically spoken separately in response to prompts from the system. This call flow considerably reduces user-related errors such as speech recognition errors. Further details of the system are described below.

Figure 1B:
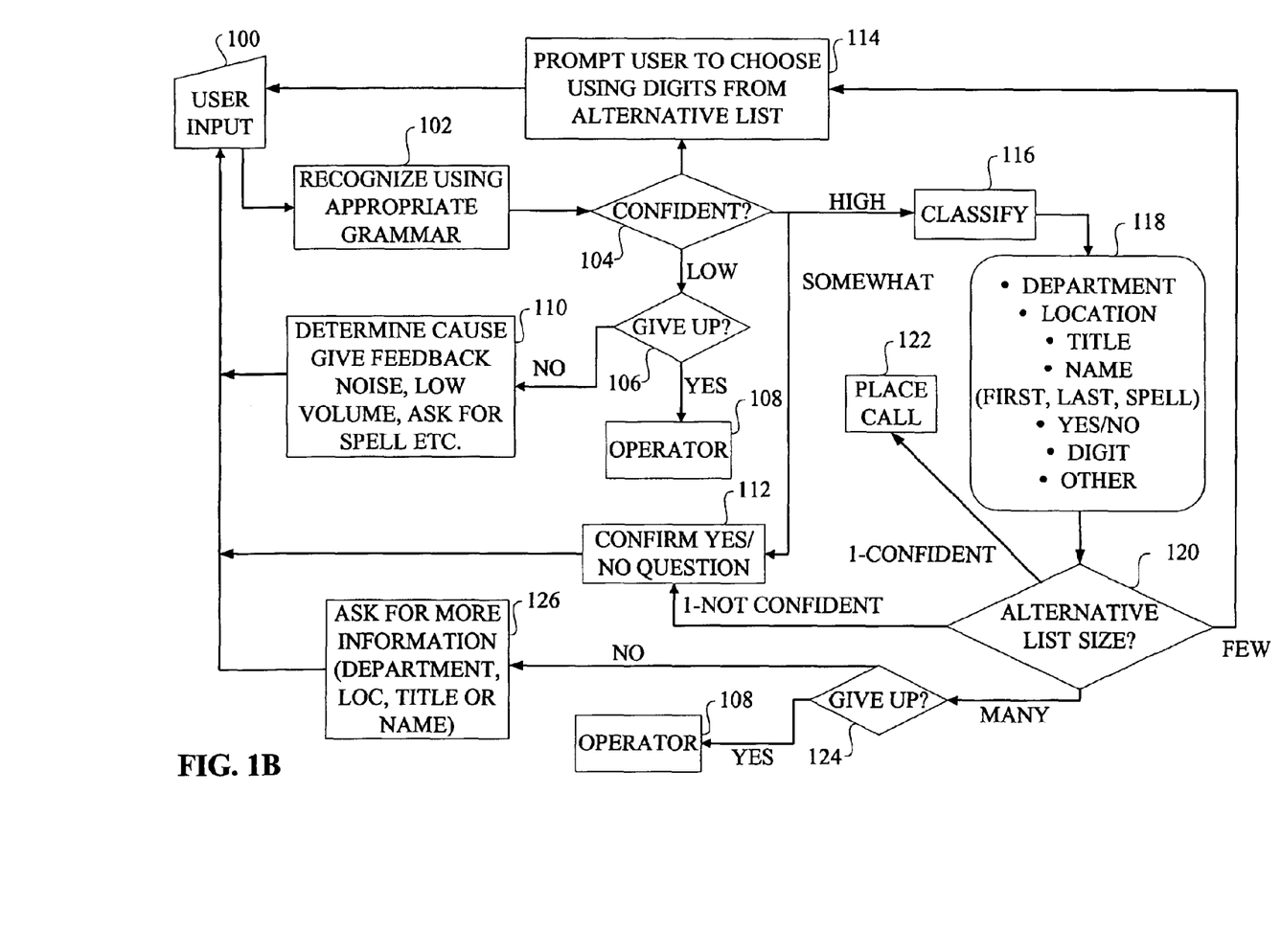
FIG. 1B is a flow diagram illustrating a conversational name dialing system in accordance with an embodiment of the present invention.

FIG. 1B illustrates a general overview of a conversational name dialing system in a flow diagram format in accordance with an embodiment of the present invention. The operations described in accordance with FIG. 1B may be performed in accordance with a name dialing system as shown in FIG. 1A. The user initially connects with the system via a telephone (e.g., telephone 20). The system is initiated in step 100 wherein a user enters a user input into the conversational name dialing system. Once the user input is detected by the system, the system analyzes the user input. In a preferred embodiment, the system applies appropriate grammar rules to determine whether it recognizes the user input, as shown in step 102.

A detailed description of a speech recognition system which may be employed in the present invention will now be given.

The speech recognition system utilized in accordance with an embodiment of the present invention may be a derivative of the IBM speech recognition system described in a paper by L. R. Bahl, P. V. de Souza, P. S. Gopalakrishnan, D. Nahamoo, M. A. Picheny, entitled "Robust Methods for Using Context-Dependent Features and Models in a Continuous Speech," pages 533–536 which was submitted to the Proceedings of IEEE ICASSP in 1994 and is hereby incorporated by reference herein. For example, in an illustrative embodiment of the present invention, the recognition system is utilized in step 102. Acoustic models are built from a telephony database of over 600 hours. The data includes spontaneous speech, read speech, personal names, zip codes, business names as seen in the yellow pages, street addresses, credit card and telephone numbers, etc. This data is collected from over 16,000 speakers.

Furthermore, test data may be collected from a live name dialing system. Two data sets collected over different periods of time may be used. The first dataset, Test. 1, contains 5.7K utterances and the second dataset, Test.2, consists of 10.9K utterances. Each utterance includes a first name and a last name, or simply the last name only, or includes the location along with the name, etc. A detailed analysis is described below.

The speech recognition system uses an alphabet of 52 phones. Each phone is modeled with a 3-state left-to-right HMM. The acoustic front-end uses a 13-dimensional cepstral feature vector extracted every 10 ms, sentence based cepstra mean normalization and 9-frame spliced linear discriminant analysis (LDA). Two different methods, the traditional LDA (lda) and weighted-LDA (wlda), may be used to perform linear discriminant analysis.

During recognition, a finite-state grammar is used as the language model. Two different grammars may be compiled, one comprising 8000 unique names (G1) and the other 280K unique names (G2). The lexicon is built with pronunciations derived from linguists and the Random House Unabridged Dictionary. Lexicon L1 consists of 8K pronunciations of 6K words and lexicon L2 consists of 97K pronunciations of 76K words. Since there is a significant number of foreign names from a wide set of nationalities, deriving pronunciations for the varied accents is a monumental task and requires several iterations before use.

The baseline system is decided in the following manner. In an effort to test the variation in the number of states and Gaussians on the recognition error rate, several systems may be built using two different decision trees, T1 and T2, both having approximately 3000 context-dependent HMM states. Tree T2 is built off clean training speech data, while Tree T1 is trained from all of the training data, which includes both clean and noisy data. Table 1 presents the error rates which may be obtained from these various systems.

TABLE 1

| | | Decision tree T1 | |
| | | | # of Gaussians |
| type of lda | testset | 70K | 40K |
| --- | --- | --- | --- |
| lda | Test.1 | 11.77% | 13.02% |
| | Test.2 | 5.75% | 6.45% |
| wlda | Test.1 | 11.74% | 12.47% |
| | Test 2 | 5.86% | 6.40% |

| | | Decision tree T2 | |
| type of lda | testset | 70K | 40K |
| --- | --- | --- | --- |
| lda | Test.1 | — | 11.60% |
| | Test.2 | — | 5.45% |
| wlda | Test.1 | — | 12.00% |
| | Test.2 | — | 5.53% |

Table 1 shows that systems using Tree T2 perform much better than those using Tree T1. Therefore, it is clear that for the name recognition task, the decision tree, which models the phonetic context of phones, should be trained using clean data. The best performing system is a lda, 40K Gaussian system built off the decision tree T2, with error rates of 11.60% and 5.45% for Test.1 and Test.2, respectively. Therefore, this system is used as a baseline system to evaluate the new algorithms.

A full analysis of the errors that include both speech recognition related and non speech recognition related errors is performed. The present invention results in at least a 50% reduction in the error rate. The analysis is made from 380 unsuccessful calls from a live system.

Table 2 illustrates the break down of speech recognition related errors from the baseline system. Some errors are combinations of different types as indicated in the second part of the table. According to the data contained in Table 2, the major sources of speech recognition error appear to be noise related errors, normal speech recognition errors and pronunciation errors. Each of these types of errors are described in greater detail below.

TABLE 2

| Type of errors | % of calls |
| --- | --- |
| Noise related errors | 30.6% |
| Normal speech recog. errors | 34.6% |
| Pronunciation errors | 21.5% |
| Spelled out names and chopped speech | 13.2% |
| The overlap between categories | |
| Pron. errors and noise | 5% |
| Pron. errors and chopped speech | 9.5% |
| Noise and chopped speech | 3.5% |

A significant challenge addressed by the present invention is a database having a large vocabulary. As expected, an increase in the size of the vocabulary and the grammar (e.g., allowing legal names) results in increased error rates (see Table 3).

TABLE 3

| | | Grammars and lexicons | |
| testset | G1, L1 | G2, L2 | G1, L2 |
| --- | --- | --- | --- |
| Test.1 | 11.77% | 22.7% | — |
| Test.2 | 5.75% | 13.8% | 5.25% |

However, an increased number of pronunciation variants alone, i.e., increasing the size of lexicon, without an increase in the grammar size does not add to the acoustic confusability, as illustrated in Table 3. In fact, this leads to lower error rates. This is primarily due to the fact that names are pronounced very differently by different people and the more pronunciation variations that are captured, the better the performance.

Speaker clustering is an effective means to improve speech recognition accuracy in large vocabulary dictation tasks. A reason that clustering is beneficial in the name recognition task is that by clustering the training data, different channels and noise (calling) conditions can be modeled by different cluster models. During recognition, a cluster that best models the test speaker and the channel condition is selected. On the other hand, speaker adaptation is an effective way to bring the performance of a speaker independent system to be closer to the performance of a speaker dependent system. Thus, in an illustrative embodiment of the present invention, variations of speaker clustering and adaptation methods are employed which provide significant gains on the large vocabulary name recognition task.

Speaker clustered systems may be built with 2 and 8 clusters. Simple HMM models that have one Gaussian per context independent phone state may be obtained for each speaker from the training data. Then, the means are clustered using a k-means algorithm. This is done for speakers that have more than 50 utterances in the training data.

The optimally selected cluster is the one that yields the maximum likelihood for each test utterance. Table 4 shows that a 12.7% relative improvement can be obtained from the 8-cluster models. In Table 4, WER refers to the word error rate and SER refers to the sentence error rate.

TABLE 4

| Model | WER | SER |
| --- | --- | --- |
| baseline | 11.6% | 12.37% |
| 2-cluster | 10.83% | 11.97% |
| 8-cluster | 10.13% | 11.39% |

When the test utterances are very short, a preferred embodiment for using clustered models is by interpolating between them using a cluster weighting scheme and combining with speaker adaptation to achieve better performance. The details are described below.

Classically in speech recognition applications such as dictation, adaptation is performed using some adaptation data collected from the test speaker. Subsequently, the Gaussian means and the variances of the speaker independent models are adapted to this speaker. However, in telephony applications, especially in name dialing, it is not always possible to gather a lot of data from a single speaker. However, usually a person calls the same set of individuals, or when the call is not successful, the caller tries the same name repeatedly. Instead of using a generic telephony speech recognition system, it is beneficial to perform adaptation on the most recent calls to enhance the performance. This new procedure is referred to as "massive adaptation" since the adaptation data is obtained from a pool of calls rather than from a single speaker. The adaptation algorithm, used in accordance with an illustrative embodiment of the present invention, may be based on the combination of papers by C. J. Leggetter, et al., entitled "Maximum Likelihood Linear Regression for Speaker Adaptation of Continuous Density Hidden Markov Models," Computer Speech and Language, Vol. 9, 1995 and J. L. Gauvain and C. H. Lee, entitled "Maximum-a-Posteriori Estimation for Multivariate Gaussian Observations and Markov Chains," IEEE Trans. Speech and Audio Processing, vol. 2, no. 2, pp. 291–298, April 1994, each of which are incorporated by reference herein.

As described above, the name dialing data is collected in two test sets, Test.1 and Test.2. Although there is no overlap between them, they have common characteristics. The two test sets may be obtained from the same name dialer and may have some common speakers (possibly calling the same person). Thus, the general telephony system is adapted to the name recognition domain using Test.2 as adaptation data to do massive adaptation on the speaker independent acoustic models. Then, the performance of Test.1 is tested before and after performing massive adaptation. The recognition accuracy improves significantly after massive adaptation, as shown in the second row in Table 5.

TABLE 5

| Method | WER | SER |
|---|---|---|
| baseline (SI) | 11.6% | 12.37% |
| baseline (massive adapted) | 9.53% | 10.52% |
| MLLR (full matrix) | 9.39% | 10.37% |
| MLLR (block diagonal) | 8.83% | 9.90% |
| CWR | 8.79% | 9.81% |
| MAPLR with CW prior | 8.33% | 9.27% |

To improve the decoding accuracy from an unknown speaker, the testing utterance itself (e.g., the user input identified in step 100) is used to do the adaptation. This process must be unsupervised, since in reality, correct script is not available. The adaptation needs to be robust to avoid over training when the adaptation utterance is very short. This robustness can be achieved by using an adaptation algorithm that requires fewer parameters to be estimated, or using prior information to constrain the estimation.

A two-pass decoding is needed for each call. In the first pass, a speaker independent system or the system after massive adaptation is used to obtain a decoded script, then a forward-backward algorithm is performed on the decoded script to obtain adaptation statistics. After adapting the acoustic models using these statistics, a second pass decoding is performed using the adapted models. For details of an adaptation procedure used in accordance with an embodiment of the present invention, see a paper by H. Erdogan, Y. Gao, and Michael Picheny, entitled "Rapid adaptation using penalized-likelihood methods," ICASSP 2001, which is hereby incorporated by reference herein.

It is contemplated that other adaptation methods may be employed. Results of the use of alternative adaptation methods are illustrated in Table 5. Although full maximum likelihood linear regression (MLLR) adaptation did not improve the error rate much, considerable improvements may be realized by doing block diagonal MLLR, cluster weighting and maximum a posteriori linear regression (MAPLR) adaptation. The best result is obtained from a modified version of MAPLR with a 12.6% relative error reduction. In Table 5, the models after massive adaptation are used as the baseline models. The adaptation statistics for utterance-based unsupervised adaptation, as shown in the last four rows on Table 5, are derived from the decoded transcriptions obtained using these models.

The last four rows in Table 5 are utterance-based adaptation schemes with the adaptation statistics percentage derived as described above.

For the Cluster Weighting and Bias method (CWB), the interpolating weights and the biases are estimated jointly using the clustered models and the statistics which may be obtained from massive adaptation models. For the MAPLR scheme, the clustered models and the weights are used to estimate the priors for the transformations.

A careful analysis of the speech recognition errors may point to the fact that about 21.5% of the recognition errors are accent or pronunciation related. Since names in general are more difficult to pronounce than other commonly used words, many of these errors are related to lack of knowledge on how to pronounce them and the differences that arise from native and non-native pronunciations. As a preliminary experiment to study the effect of automatically derived pronunciations from acoustic evidence alone on this name dialing task, the algorithm presented in a paper by B. Ramabhadran, L. R. Bahl, P. V. deSouza and M. Padmanabhan, entitled "Acoustics-Only Based Automatic Phonetic Baseform Generation," Proceedings of ICASSP 1998, Vol. 1, pages 309–312, 1998, which is hereby incorporated by reference herein, is used.

A trellis of sub phone units is constructed from the user input provided in step 100, in accordance with an illustrative embodiment of the present invention. The probability of a transition occurring from one node to another in the trellis is determined by weighting the score obtained from a HMM with a precomputed node-to-node transition probability obtained from a database of names.

The algorithm is applied to sample user inputs of every name in a subset of a test set. The derived pronunciation is then added to the lexicon and the remaining utterances in the test set are decoded using the new lexicon. A reduction in the error rate from 13.37% to 11.09%, i.e., relative 17.0% improvement, is seen if the acoustically derived pronunciations are added to the lexicon. When the same lexicon is used to decode a subset of Test.2, the improvement in error rate is not significant. This is explained by the fact that the names in Test.2 and Test.1 do not significantly overlap. Therefore, the newly added pronunciations are hardly used. However, careful analysis of the decoding results indicates that if an automatically derived pronunciation exists in the lexicon for a name in the test set, the decoder may prefer this pronunciation to the linguistically generated one.

This algorithm can also serve as a means to derive personalized vocabularies. This feature enables the user to add words to his or her personalized vocabulary, for which an a priori spelling or acoustic representation does not exist in the lexicon, and associate that word(s) with a phone number to be dialed. Once the personalized vocabulary is configured, the user can subsequently dial the phone number by speaking the new word(s) just added to the vocabulary.

Given the detailed description of illustrative embodiments of a speech recognition system that may be employed in accordance with the conversational name dialing system of the invention, the detailed description now returns to FIG. 1B to explain what occurs after a user utterance is recognized.

In step 104, the system makes a determination as to the level of confidence regarding how well the user input is recognized. The present invention contemplates at least four levels of confidence, i.e., a low amount of confidence, somewhat confident, a medium amount of confidence and a high amount of confidence. The level of confidence may be determined by various methods known to one having ordinary skill in the art. For example, a decoder (e.g., speech recognition module 35 illustrated in FIG. 1A) receives the user input and provides an output to another module associated with the conversational name dialing system. It is contemplated that the decoder may be located within or outside of the conversational name dialing system.

The output of the decoder includes a probability factor relating to the likelihood that the decoder accurately recognized the user input as a word as is known to one having ordinary skill in the art. See, for example, a paper by B. Maison and R. Gopinath, entitled "Robust confidence annotation and rejection for continuous speech recognition," ICASSP 2001, and a paper by T. Kemp and T. Shaaf, entitled "Estimating confidence using word lattices," Eurospeech 1997, pp. 827–830, each of which are incorporated by reference herein. For example, the probability factor may be a number between one and zero. In that case, the confidence levels of low, somewhat, medium and high may correspond to the probability ranges of 0–0.25, 0.26–0.50, 0.51–0.75 and 0.76–1.0, respectively. It is contemplated that more or less confidence levels may be employed and the probability ranges associated with the levels may vary.

If the level of confidence is low, the system contemplates whether to terminate the conversational process and give up in step 106. If the system decides to terminate the process, the call is forwarded to a live operator 108. If the system decides not to terminate the process, an analysis is made to determine the cause of the low level of confidence. A decision regarding whether or not to terminate the process may be based, for example, on historical data associated with the system. That is, a user may provide an identical response or user input four consecutive times. A threshold value may be programmed into software associated with the conversational name dialing system which requires a connection to a live operator after three of the same responses from a user without getting any closer to a viable candidate. Alternatively, a threshold value may be based on the number of prompts that the system makes to acquire relevant and comprehensible information from the user.

One reason why a name dialing system fails to properly identify potential recipients of the user's telephone call is because the volume of the user's voice is too high or too low. For example, some people yell into the microphone or telephone. However, yelling into the telephone often distorts the caller's voice, thereby making it more difficult to understand what the caller is trying to say. Other callers mumble and/or speak very quietly. The conversational name dialing system in accordance with the present invention, as illustrated in step 110, is configured to provide feedback regarding the volume of speech and request the user to speak louder or quieter as the case may be.

Similarly, if the background noise level is too high, speech recognition accuracy will be poor. The conversational name dialing system is configured to provide feedback to the user (see FIG. 1B, step 110) so that the user may attempt to reduce or eliminate the background noise (for example, by attempting the call from a new, more quiet, location). Alternatively, or if the problem persists, the call may be transferred to a live operator, as illustrated in step 106.

As indicated in step 110, the system will determine the cause of the low level of confidence and get feedback to the user in an attempt to correct the problem. Causes of the low level of confidence include, for example, noise in the background where the caller is attempting to make a call from, or low volume in the caller's voice as described above. Therefore, in step 110, the system can provide feedback to the user so that the user has the option of remedying the problem or, alternatively, the system may request the user to spell out the name of the person that the user is looking for. In the situation where the user spells out the name of the person, the process starts over again at step 100 wherein the user again issues a user input into the telephone for recognition by the system.

It is also contemplated that a syllable-based approach where the syllables are trained specifically on the data from names may be utilized in modeling pronunciation variations.

A significant number of errors are caused by difficulties encountered in pronouncing the names, especially the last names, of people of foreign-origin. Foreign names are often difficult to pronounce for speakers who are not familiar with the names and there are no standardized methods for pronouncing proper names. This causes callers to not complete the pronunciation of the name within the specified time duration. This also leads to pauses and hesitations. Thus, both native and the Anglicized pronunciations are incorporated into the conversational name dialing system.

To further reduce the amount of errors, the spelling of the last name is an option. The spelled out version of the last name is treated as an alternative pronunciation of the last name for difficult names. Use of spelled names for improving recognition when the confidence measure associated with the recognized utterance falls below a threshold is contemplated. A level of difficulty is determined in one of several ways. For example, popular names are grouped into an "easy" list and not so common names are included in another list.

Homonyms are another source of error. In the situation that "SMITH", "SMYTH" or "SMYTHE" is a last name, the first name will decide the person being called. However, if the first name is also ambiguous, for example, "VICKI", "VICKY", or "VICKIE", this is a more difficult problem to solve.

Table 6 is a categorization of non-speech recognition errors. Table 6 indicates that a large portion of unsuccessful calls is due to out of vocabulary (OOV) names (i.e., names of people who no longer exist in the database). Table 6 further indicates that a need exists for a good confidence measure scheme to reject such calls or to remind callers to verify the names they are calling in order to increase the system usability. Thus, confidence measures can be used to reject OOV names or to verify the recognition results.

TABLE 6

| Type of errors | # of calls | % of calls |
| --- | --- | --- |
| Words that are not names | 17 | 4.5% |
| Last name only | 48 | 12.6% |
| First name only | 34 | 8.9% |
| Wrong version of first name | 40 | 10.5% |
| Duplicated first name | 7 | 1.8% |
| First/last name reversed | 5 | 1.3% |
| Names that are hard to pronounce | 75 | 19.8% |
| OOV names | 140 | 36.8% |

During the speech recognition step (e.g., step 102 in FIG. 1), when several names obtain relatively close scores, the entire recognized list may be read to the user. However, in a preferred embodiment, the conversational name dialing system is configured to perform one of several functions in an attempt to narrow the list of the potential candidates. For example, the user is prompted to spell out the name, as illustrated in step 110, of FIG. 1B. This additional information is used to distinguish the desired name from the recognized list.

If the level of confidence is classified as somewhat confident, the system will attempt to confirm the user input by asking the user a yes or no question, in step 112. Therefore, it is anticipated that a higher level of confidence will result from the next user input, since the next user input will be the response from the user to the yes or no question. For example, the system may ask the user if the user is attempting to contact "Joe Smith—yes or no." If so, the user will respond "yes."

If there is a medium level of confidence, the process proceeds to step 114 wherein the system prompts the user to choose from a selection provided by the system in an alternative list. The alternative list is a subset of a predetermined vocabulary and represents a list of potential match candidates. The process or the system requests that the user selects a response from the alternative list by depressing numbers on the telephone number pad. For example, a source of errors exists when there are two or more names that sound the same, phonetically. In that situation, the present invention is configured to provide a set of choices and let the user select the desired name by saying 1, 2, 3, etc., by using the telephone number pad or by saying the desired name. For example, "say or press 1 for Larry Baxler; say or press 2 for Larry Bachler; say or press 3 for other," as illustrated in step 255 of FIG. 2.

After step 114, the process returns to step 100 wherein another user input is entered by the user. In this case, the user input is an electronic signal as a result of the depression of a numeral on the keypad for the telephone. Accordingly, since there is a minimal amount of room for error (e.g., such as common errors associated with speech recognition), the confidence level from the electronic user input is high. In the scenario wherein the confidence level is high, the system attempts to narrow the alternative list by further classifying the request made by the user, starting in step 116. The purpose of the various classifications is to allow the system to further narrow the list of potential candidates.

Making the name dialing application more conversational increases the user friendliness and reduces the non speech recognition related errors. For example, introduction of hierarchical grammars that are organized based on location of the individuals being called resolve some amount of ambiguity and assist in increasing recognition accuracy.

In step 118, the conversational name dialing system narrows the alternative list by requesting additional information from the user such as, for example, information relating to the person that the user is attempting to contact such as department, location, title, and/or name. Alternatively, the system may ask the user a yes/no question, or request that the user depresses a digit on the telephone keypad. In step 120, based on the classification and the user input, the system generates an alternative list and determines what the size of that alternative list is. For example, the alternative list size may include a few entries, many entries or one entry. If the alternative list size is one, the system must still determines whether the system is confident with that one choice. If the system is confident with the one choice, the process proceeds to step 122 wherein the call is placed. If the system is not confident, but the list size is still one, the system can pose another question (e.g., a yes or no question as in step 112) to the user to determine whether the single entry on the alternative list is the actual person that the user is looking for.

The system may also determine that there are many entries on the alternative list. In that case, the process proceeds to step 124 where the system determines whether or not to terminate and give up. If, in step 124, the system decides to stop proceeding, the call is directed to a live operator 108. If the system decides not to cease all processes, the system requests additional information from the user such as, for example, the department, location, title or name, in step 126. Once the additional information is provided, the process starts all over again at step 100. Lastly, if the system determines that only a few entries exist on the alternative list, the system returns to step 114 and prompts the user to choose from the alternative list using the digits on the telephone keypad. The reference to "a few entries" on the alternative list means that there are less than ten entries, so that there will be a sufficient number of digits on the telephone keypad for the user to be able to select one of the entries by depressing the associated digit. Preferably, the alternative list will only contain three or four entries.

The act of distinguishing between two or more similar words is performed based on known processes such as N-best hypotheses, phone decoding or any other confusability measure. Alternatively, if the first names and last names are spelled differently but pronounced the same way, additional information (e.g., the department name, office location or job responsibility) is provided in response to prompts initiated by the conversational name dialing system, as illustrated in step 126. Many of the first names have shortened versions, or nicknames. In a limited vocabulary and finite-state grammars, it is not possible to include all such versions or combinations of the name. If a caller uses a nickname which is not in the vocabulary or the grammar, or a nickname followed by the formal first name and the last name, the call fails. Table 7 presents a few such examples. If the system still cannot distinguish between two or more similar words, the call is transferred to a live operator. In accordance with an embodiment of the present invention, incorporation of nicknames and repetitive usage of different variations of first names into the grammar increase the success rate of the calls.

TABLE 7

| In Vocabulary | Caller said |
| --- | --- |
| Robert Dalrymple | Rob Dalrymple |
| Robert Dalrymple | Rob Robert Dalrymple |
| Eugene Clark | Gene Clark |
| Andrew Waldrow | Andy Waldrow |

Figure 2:
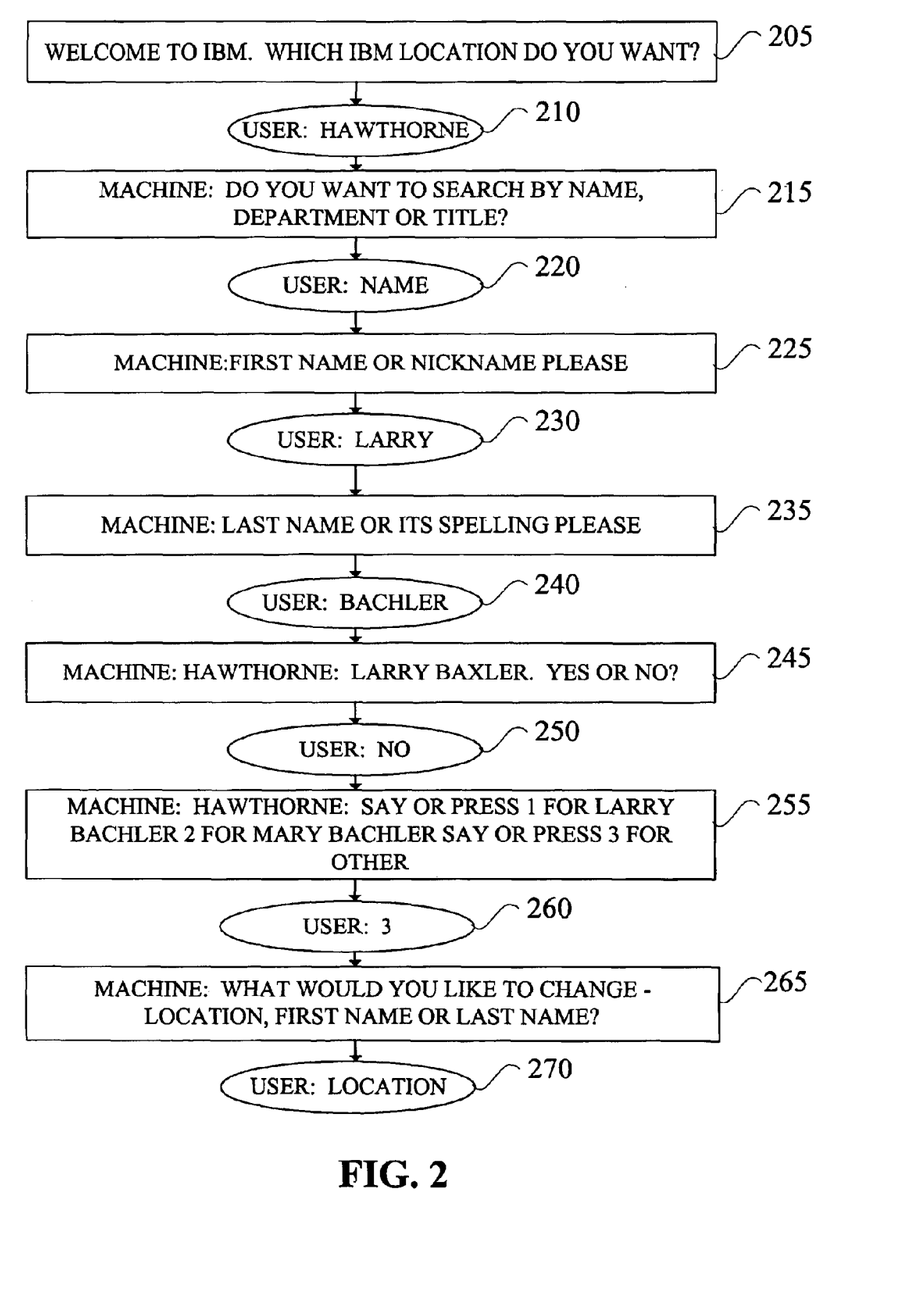
FIG. 2 is a flow diagram illustrating an example of a conversation between a user and a machine, in accordance with an embodiment of the present invention.

FIG. 2 illustrates an example of a conversation utilizing a method in accordance with an embodiment of the present invention. The conversation between a user and the name dialing system is similar to a conversation between a user and a live operator. The term "user" as referred to herein is intended to refer to the person who initiates the phone call and is attempting to contact a person (i.e., an intended recipient of the telephone call) through the conversational name dialing system. As illustrated in FIG. 2, upon connection with the conversational name dialing system, in step 205, the system greets the user and initiates a conversation. For example, the system states "Welcome to IBM. Which IBM location do you want?" In step 210, the user responds with the location "Hawthorne." The system then solicits information in an attempt to classify the request, thus narrowing the potential correct responses. The system becomes more accurate each time that it is able to narrow the database from which it will select the ultimate name.

In step 215, the system asks the user whether he or she would like to search by name, department or title. The user decides to search by name, in step 220, and responds accordingly. In steps 225 and 230, respectively, the system again narrows the search by first requesting the first name of the person that the user desires to call and then requesting the last name. Alternatively, the system may request, or the user may provide, a nickname for the person that the user is attempting to contact, instead of the formal first name. Steps 215 and 225 correspond, for example, to step 126 in FIG. 1B. In another alternative embodiment of the present invention, the system requests the user to spell the first and/or last names of the person that the user wishes to communicate with.

The conversational name dialing system in accordance with an embodiment of the present invention is configured to identify a nickname which is used instead of a formal first name. The system will consider the nickname as an alternative pronunciation of the formal first name, as illustrated, for example, in step 225 of FIG. 2. For example, the system is configured to recognize Eddie or Ed for Edward and Bill or Billy for William. The nicknames are stored in memory which may be accessed via a readily available dictionary.

Once the system has the necessary information, the system provides the user, in step 245, with a name that the system has determined most resembles the name that the user is searching for. Once a name is offered to the user, the system requests confirmation that the offered name is correct, in the form of a yes or no response (see, e.g., step 112 in FIG. 1B). In the example conversation of FIG. 2, the user's response is no in step 250, indicating that the system provided an incorrect name.

In response to the negative response from the user, the system provides the user with an alternative list of names in step 255. Also in step 255, the system instructs the user to depress certain buttons on the telephone keypad to indicate which, if any, name on the alternative list is the correct name (see, e.g., step 114 in FIG. 1A). Since the user still does not recognize any of the names provided by the system, in step 260, the user chooses option 3 to indicate that the user is requesting other names. The system then begins the classification process again, in step 265, in an attempt to provide the user with another, more accurate, alternative list. In step 270, the user responds by indicating that a new location should be searched.

Figure 3:
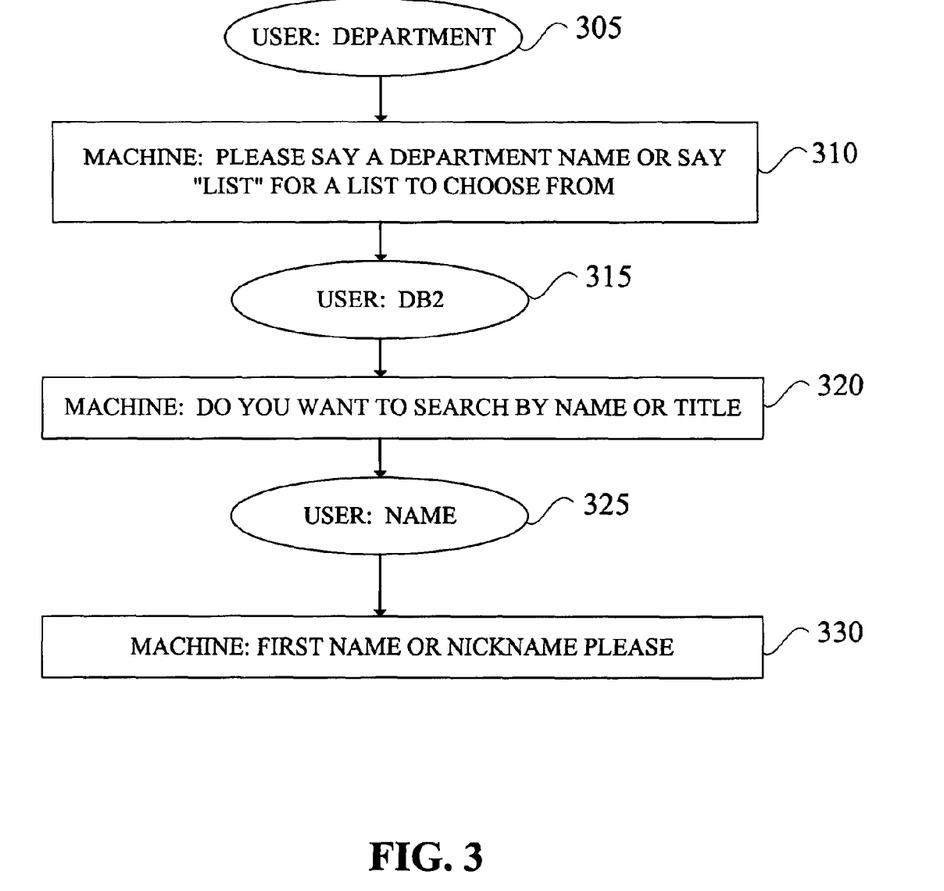
FIG. 3 is a flow diagram illustrating an example of a conversation between a user and a machine beginning with the department of the person that the user wants to contact, in accordance with an embodiment of the present invention.

FIG. 3 provides an illustration in the form of a flow diagram of an alternative response to the question that was asked in step 265 in FIG. 2. That is, instead of changing the location, the user, in step 305, elects to change the department and search again for the desired name. In step 310, the system requests that the user respond with the department name, or the word "list" to see a list of the departments to choose from. The user responds, in step 315, with the department name "DB2." In step 320, the system asks the user whether to search by name or title. The user decides to search by name, in step 325. In step 330, the system again narrows the search by requesting the first name of the person that the user desires to call. As indicated in step 330, the user may also provide the nickname of the person that he or she is attempting to contact. Steps 310, 320 and 330 correspond, for example, to step 126 in FIG. 1B.

Figure 4:
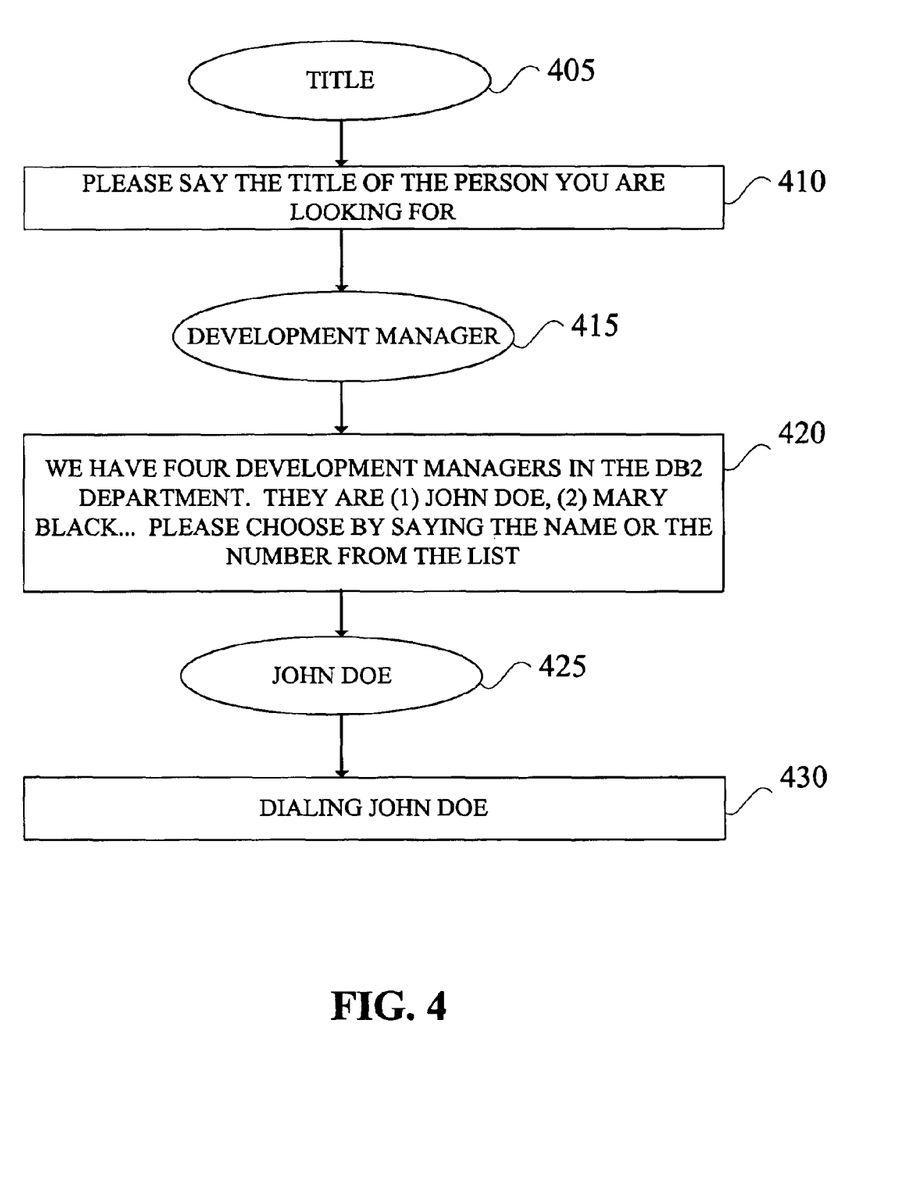
FIG. 4 is a flow diagram illustrating an example of a conversation between a user and a machine wherein the machine is requesting title information from the user, in accordance with an embodiment of the present invention.

FIG. 4 is a flow diagram illustrating a dialog between a user and a name dialing system in accordance with an embodiment of the present invention. In FIG. 4, instead of searching by name, the user now elects to search by title in step 405. Accordingly, in step 410, the system responds by prompting the user to say the title of the person that he or she is looking for. In step 415, the user indicates that he or she would like to speak with the Development Manager. The system then provides the user with a list of four names to choose from, in step 420, and requests that the user indicates his or her preference by saying the name or number corresponding to the preferred name. In steps 425 and 430, respectively, the user indicates that he or she would like to speak with John Doe and the system begins dialing John Doe. The system dialing function is illustrated, for example, in step 122 of FIG. 1B.

Figure 5:
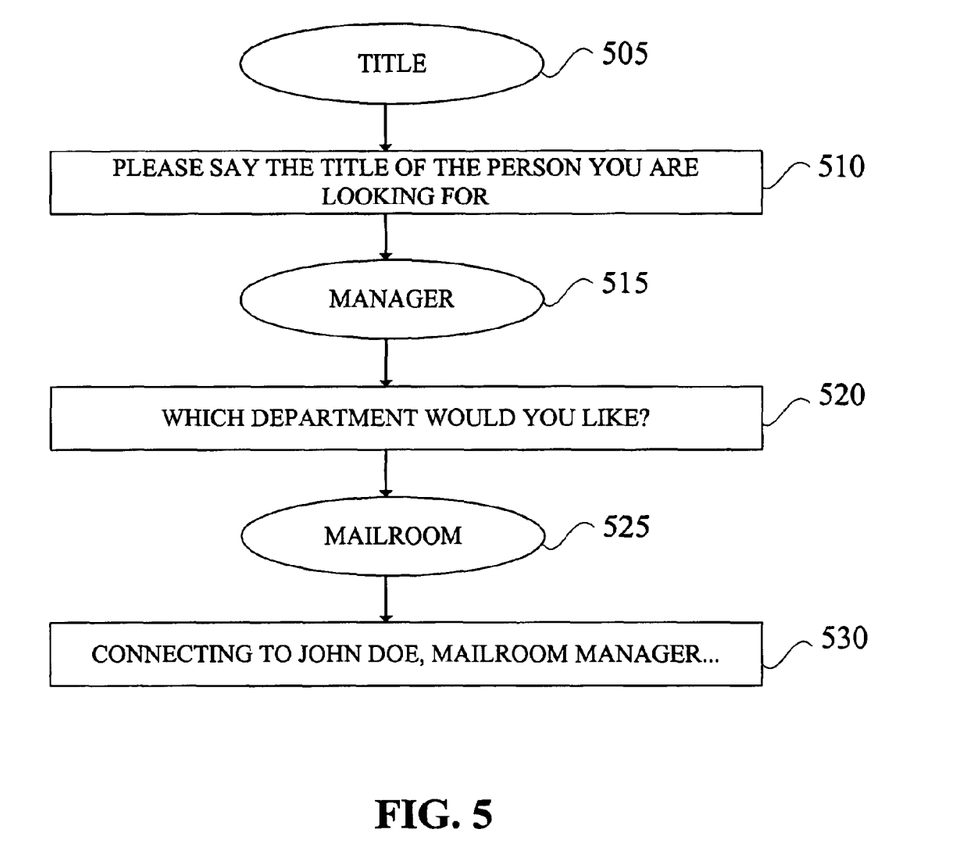
FIG. 5 is a flow diagram illustrating an example of a conversation between a user and a machine wherein the machine is requesting title and department information from the user, in accordance with an embodiment of the present invention.

FIG. 5 is a flow diagram illustrating a dialog between a user and a name dialing system in accordance with an embodiment of the present invention. FIG. 5 begins in a similar way that FIG. 4 begins. That is, steps 505 through 515 are similar to steps 405 through 415 to the extent that the user indicates that the search will begin with a search of all employees having a similar title. However, the two figures differ due to the response of the user in step 515. In step 515, the user responds with the title of Manager. Since this title is very generic, a search based on the title "Manager" will result in a list of names that is very large. Therefore, in step 520, the system attempts to narrow the list of possible candidates by asking the user which department he or she would like to access (see, e.g., step 126 in FIG. 1B). In steps 525 and 530, respectively, the user informs the system that he or she would like to speak with the manager of the mailroom. Accordingly, the system connects the user to John Doe, the mailroom manager.

Figure 6:
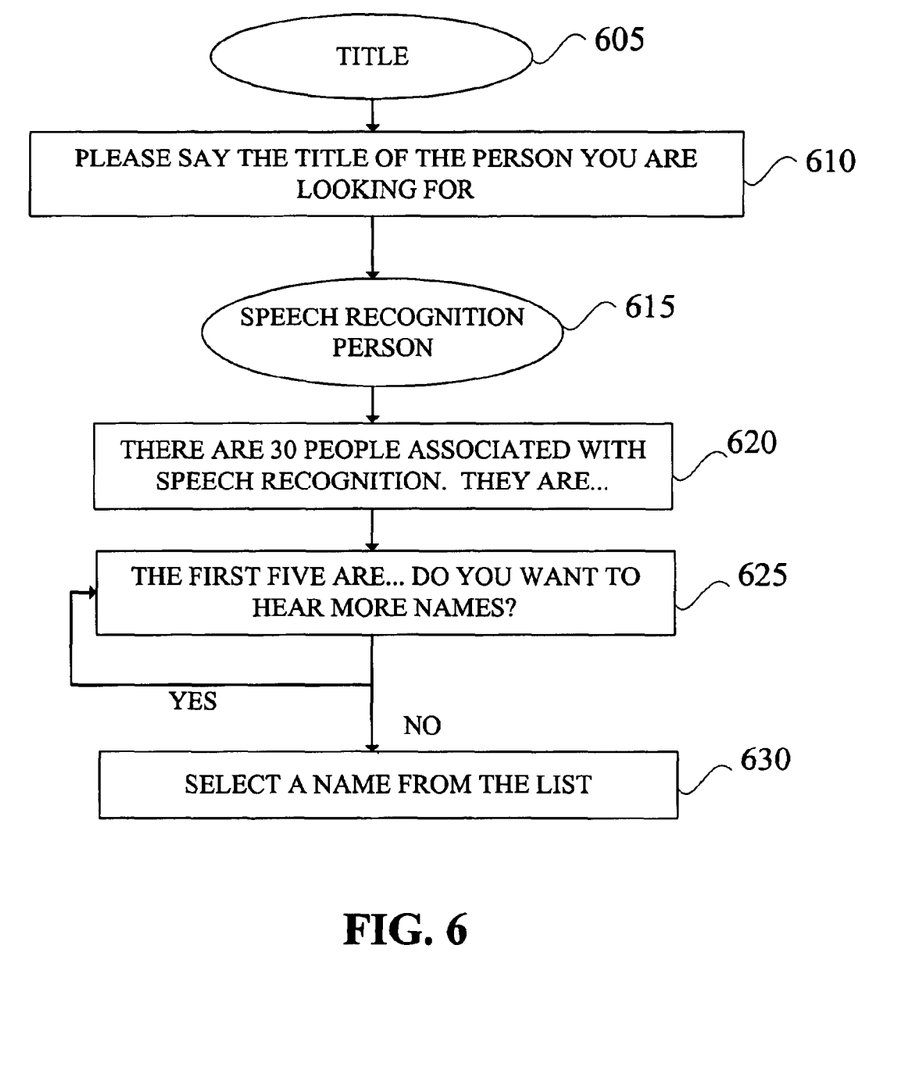
FIG. 6 is a flow diagram illustrating an example of a conversation between a user and a machine wherein the machine is requesting title information from the user, in accordance with an embodiment of the present invention.

FIG. 6 illustrates another alternative embodiment of the present invention. The first three steps in FIG. 6 are similar to those in FIGS. 4 and 5. That is, in steps 605, 610 and 615, the user chooses to perform a search based on the title of the person, the system requests the title of the person the user is looking for and the user responds. However, in this embodiment, an aspect of the name dialing system is illustrated wherein there are thirty people that could satisfy the user's inquiry criteria, as indicated in step 620. Accordingly, in step 625, the system reads out the first five potential candidates and then asks if the user wants to hear more names. If the user's answer is yes, step 625 is repeated and five additional names are announced. If the user's answer is no, the system prompts the user, in step 630, to select a name from the list.

Figure 7:
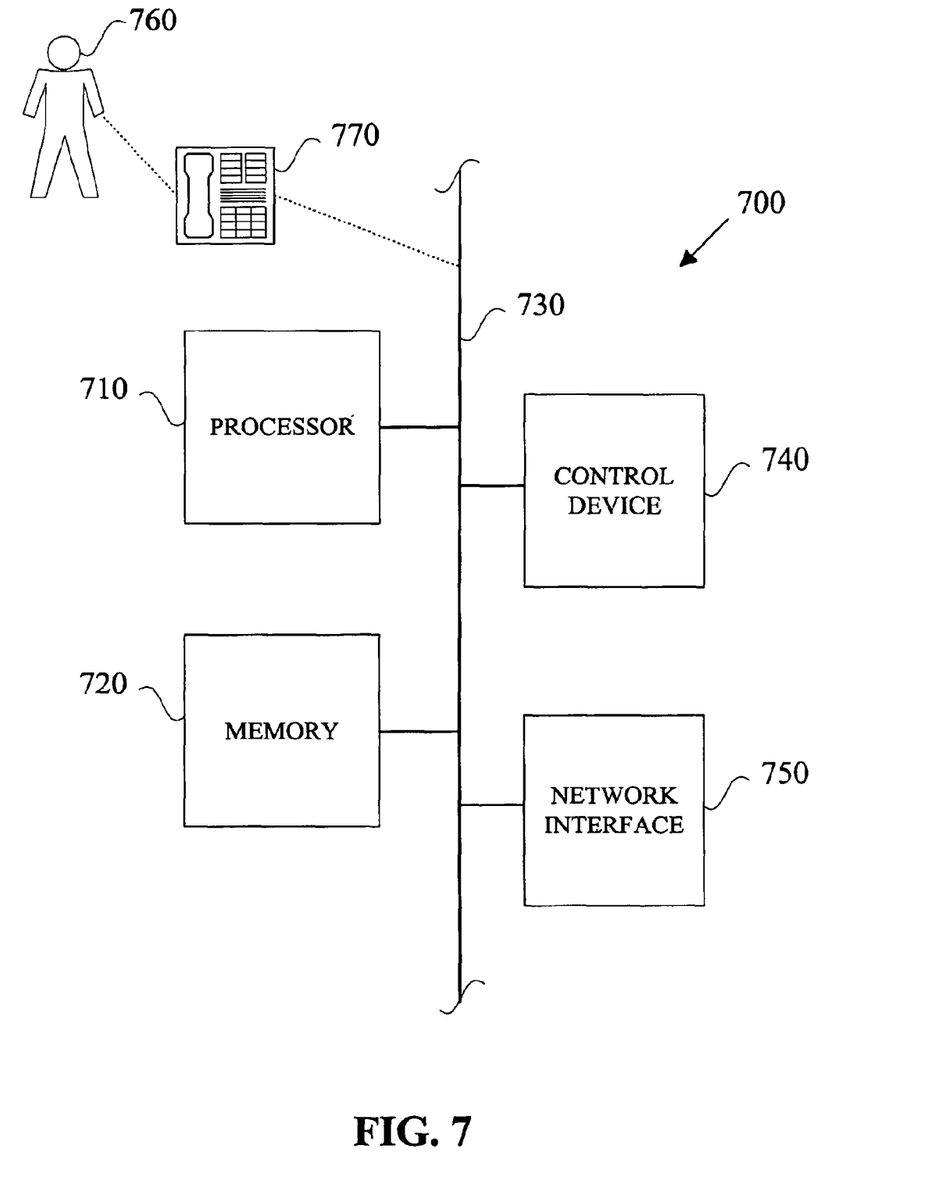
FIG. 7 is a block diagram illustrating a processing device for use in accordance with an embodiment of the present invention.

FIG. 7 shows an example of a processing device 700 that may be used to implement, for example, one or more computer software programs for executing the functions of the present invention. As such, a user 760 may access the processing device 700 in an effort to communicate with a person within a company associated with the processing device. The user 760 accesses processing device 700 via a communication device such as a telephone 770 or another communication device.

The processing device 700 includes a processor 710 and a memory 720 which communicate over at least a portion of a set of one or more system buses 730. Also utilizing a portion of the set of system buses 730 are a control device 740 and a network interface device 750. The processing device 700 may represent, for example, a desktop computer or any other type of processing device for use in implementing at least a portion of the functions in accordance with the present invention. The elements of the processing device 700 may correspond to conventional elements of such devices.

For example, the processor 710 may represent a microprocessor, central processing unit (CPU), digital signal processor (DSP), or application-specific integrated circuit (ASIC), as well as portions or combinations of these and other processing devices. The memory 720 is typically an electronic memory, but may comprise or include other types of storage devices, such as disk-based optical or magnetic memory. The memory 720 may be, for example, database 45 illustrated in FIG. 1A. The control device 740 may be associated with the processor 710. The control device 740 may be further configured to transmit control signals, such as, for example, signals that may effectuate the operations with respect to controller 40 of FIG. 1A. The network interface device 750 can be used to communicate with an external database, similar to database 45 illustrated in FIG. 1A, or with the company telephone system, such as phone system 25 illustrated in FIG. 1A.

The techniques of the present invention described herein may be implemented in whole or in part using software stored and executed using the respective memory and processor elements of the processing device 700. For example, the techniques may be implemented at least in part using one or more software programs stored in memory 720 and executed by processor 710. The particular manner in which such software programs may be stored and executed in device elements such as memory 720 and processor 710 is well understood in the art and therefore not described in detail herein. The processing device 700, processor 710 and memory 720 may be, for example, conversational name dialing system 10, controller 40 and associated functional blocks (speech output module and speech recognition module) and database 45, respectively.

It should be noted that the processing device 700 may include other elements not shown, or other types and arrangements of elements capable of providing the function of the present invention described herein.

All of the above design features and improvements to speech recognition have a cumulative effect in reducing the overall errors during usage. These incremental steps can bring down the error rate by as much as 50%.

Although the large vocabulary name recognition task in accordance with an embodiment of the present invention is different from any other LVCSR task defined in the literature, algorithms used in LVCSR tasks are applicable to this task also. More specifically, rapid adaptation and unsupervised utterance adaptation techniques are extremely valuable to this kind of an application. This is primarily due to the small amount of data (3 seconds or less) available for adaptation. Speaker clustering and massive adaptation algorithms serve to match the test data with the training data, including channel and environment noise. The adaptation algorithms that have been described herein are very effective for this task. It is also important to model the phonetic contexts with clean data to eliminate any noisy alignments. The speaker independent models can then be built out of both clean and noisy data. Collectively, gains in recognition accuracy of about 28% relative have been obtained.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention. For example, features of the present invention are also applicable to other conversational systems.

What is claimed is:

1. An automated method of conversational name dialing, the method comprising the steps of:
   analyzing an input from a user, wherein the input comprises information directed to identifying an intended recipient of a telephone call from the user;
   identifying at least one candidate for the intended recipient, in response to the input, wherein the at least one candidate represents at least one potential match between the intended recipient and a predetermined vocabulary;
   determining a confidence measure indicative of a likelihood that the at least one candidate is the intended recipient; and
   prompting the user for additional information to increase the likelihood that the at least one candidate is the intended recipient, wherein a prompt type is selectable from a group comprising two or more prompt types, each prompt type obtaining a specified type of additional information from the user, and selected in accordance with the determined confidence measure.

2. The method as recited in claim 1 further comprising the step of confirming the identification of the at least one candidate as the intended recipient.

3. The method as recited in claim 2 further comprising the step of dialing the intended recipient when the identification of the at least one candidate as the intended recipient is confirmed.

4. The method as recited in claim 2 wherein the confirming step includes the step of asking the user a yes or no question.

5. The method as recited in claim 1 further comprising the step of providing feedback to the user to increase the likelihood that the at least one candidate is the intended recipient.

6. The method as recited in claim 5 wherein the feedback to the user includes an indication that the volume of the user's voice is too low.

7. The method as recited in claim 1 further comprising the step of forwarding the user to an operator when the identification of the at least one candidate as the intended recipient is not confirmed.

8. The method as recited in claim 1 further comprising the step of classifying the intended recipient into one or more classifications.

9. The method as recited in claim 8 wherein the one or more classifications include at least one of a department, a location, a title, a name, a yes or no response and a digit.

10. The method as recited in claim 1 further comprising the step of prompting the user to confirm the identification of the at least one candidate as the intended recipient.

11. The method as recited in claim 10 wherein the identification of the at least one candidate as the intended recipient is performed by depressing at least one number on a keypad of a telephone.

12. The method as recited in claim 1 wherein the analyzing step comprises the step of recognizing the input by using a predetermined grammar.

13. The method as recited in claim 1 wherein the input is analyzed using a speech recognition algorithm.

14. The method as recited in claim 1 wherein the predetermined vocabulary includes nicknames.

15. The method as recited in claim 1 further comprising the step of employing an adaptation method.

16. An automated conversational name dialing apparatus comprising:
   a processing device having a processor and memory, the processor configured to analyze an input from a user, wherein the input comprises information directed to identifying an intended recipient of a telephone call from the user; identify at least one candidate for the intended recipient, in response to the input, wherein the at least one candidate represents at least one potential match between the intended recipient and a predetermined vocabulary; determine a confidence measure indicative of a likelihood that the at least one candidate is the intended recipient; and prompt the user for additional information to increase the likelihood that the at least one candidate is the intended recipient, wherein a prompt type is selectable from a group comprising two or more prompt types, each prompt type obtaining a specified type of additional information from the user, and selected in accordance with the determined confidence measure.

17. The apparatus as recited in claim 16 wherein the processor is configured to analyze native and non-native pronunciations of foreign names.

18. The apparatus as recited in claim 16 wherein the memory comprises a large vocabulary.

19. An article of manufacture for automated conversational name dialing, the article comprising a machine readable medium containing one or more programs which when executed implement the steps of:

- analyzing an input from a user, wherein the input comprises information directed to identifying an intended recipient of a telephone call from the user;
- identifying at least one candidate for the intended recipient, in response to the input, wherein the at least one candidate represents at least one potential match between the intended recipient and a predetermined vocabulary;
- determining a confidence measure indicative of a likelihood that the at least one candidate is the intended recipient; and
- prompting the user for additional information to increase the likelihood that the at least one candidate is the intended recipient, wherein a prompt type is selectable from a group comprising two or more prompt types, each prompt type obtaining a specified type of additional information from the user, and selected in accordance with the determined confidence measure.

* * * * *